A. LOOMIS.
UNIVERSALLY JOINTED SHAFT.
APPLICATION FILED MAR. 26, 1907.
1,010,060.
Patented Nov. 28, 1911.
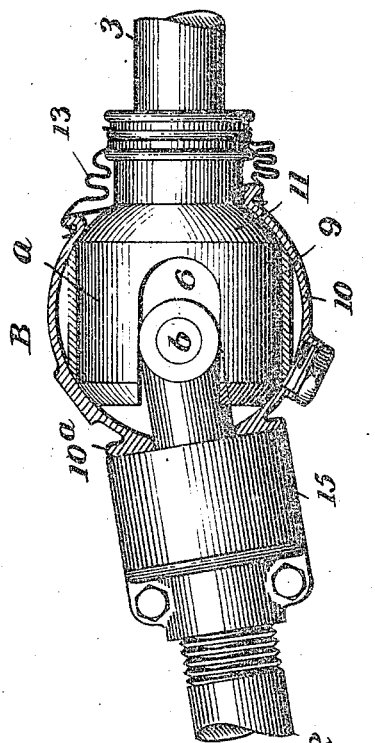
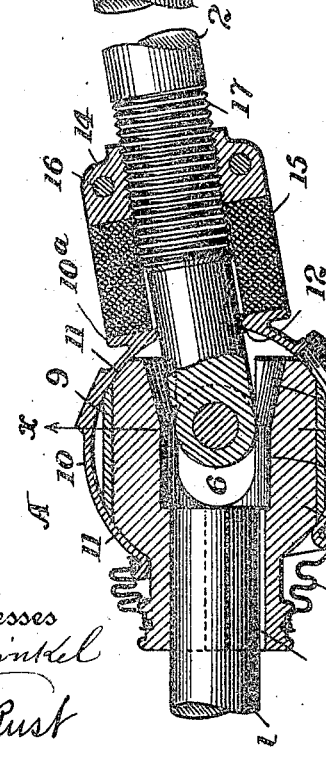
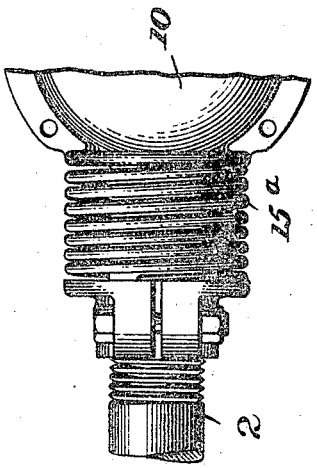
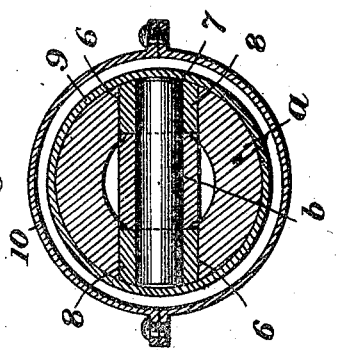
Fig. 1. Fig. 2. Fig. 3.
Witnesses
J. G. Stinkel
B. C. Rust
Inventor
Allen Loomis
By Foster Freeman & Watson
Attorneys

UNITED STATES PATENT OFFICE.

ALLEN LOOMIS, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

UNIVERSALLY-JOINTED SHAFT.

1,010,060. Specification of Letters Patent. Patented Nov. 28, 1911.

Application filed March 26, 1907. Serial No. 364,707.

*To all whom it may concern:*

Be it known that I, ALLEN LOOMIS, a citizen of the United States, and resident of Detroit, Wayne county, State of Michigan, have invented certain new and useful Improvements in Universally-Jointed Shafts, of which the following is a specification.

This invention comprises improvements in universal joints for sectional shafts, and it relates particularly to means for permitting an intermediate section of a shaft to play endwise relatively to the adjoining sections and for holding the intermediate section in a central position relatively to the coupling members of the adjoining sections, and also to means for excluding dust from, and retaining lubricant within, the universal joints.

My improvements are particularly adapted for use in connection with the transmission shafts of automobiles, wherein there is a relative up and down movement between the clutch shaft and the shaft connected with the differential gearing.

In the accompanying drawing, Figure 1 is a side elevation of portions of three sections of a shaft having my improvements, one of the couplings being shown in longitudinal section; Fig. 2 is a section through one of the couplings on the line X—X of Fig. 1, and Fig. 3 is a detail view showing a modified form of spring for holding the intermediate section of the shaft in position.

Referring to Figs. 1 and 2 of the drawing, 1, 2 and 3 indicate shaft sections connected together by universal joints A and B. The shaft or section 3 may, for convenience, be referred to as the driving shaft, the section 2 may be referred to as the intermediate shaft or section, and the shaft 1 may be called the driven shaft. The joints A and B are alike in construction. Upon the driving and driven shafts are arranged coupling members $a$, which are suitably secured to said shafts by keys 4. The member $a$ of each coupling has a socket 5 which flares outwardly at the end, as shown at $5^a$, and it has diametrically opposite guide slots 6. The intermediate shaft section 2 has at its ends joint members each comprising a pin 7, which extends through the shaft section and carries at its ends a pair of rollers 8, which are movable within the guide slots 6. A sleeve 9 surrounds the member $a$ and holds the rollers in position upon the pin, and the outer faces of the rollers are conoidal, as shown, conforming to the inner curved face of the sleeve so as to permit the play of the member $b$, which comprises the pin 7 and rollers 8, as it takes positions at angles to the axis of the member $a$. A spherical metal casing 10 is mounted on the member $a$ and rests against spherical bearing surfaces 11 upon said member. This casing has an opening 12 through which the intermediate shaft section 2 extends, and a flexible guard 13 is arranged between the hub of the member $a$ and the adjacent end of the casing 10, to exclude dust from the casing and bearing surfaces at that end of the casing which is opposite the opening 12. The casing both excludes the dust from the joint and retains the lubricant.

The construction of the joint, so far described, is substantially the same as that shown in the copending application of Russell Huff, Serial Number 323,604, filed June 27, 1906. In the invention disclosed in said copending application, metal springs are arranged within the sockets of the coupling members for the purpose of holding the intermediate shaft section in central position between the coupling members of the driving and driven shafts. In the present invention instead of arranging springs within the sockets, I arrange upon the intermediate shaft section, near each end, a stop 14, and between said stop and a flange $10^a$ on the adjacent casing 10, I arrange a spring 15. This spring preferably consists of a ring of solid rubber, as shown in Fig. 1, which completely surrounds the shaft section and incloses the space between the flange $10^a$ and the stop 14, thus serving as a spring and also as a means for excluding dust from the coupling and for retaining the lubricant. Each stop 14 preferably consists of a collar made in two parts, which parts are connected together by bolts 16. The shaft has threads 17 near each end and the collars 14 are threaded and fit on to the threaded portions of the shaft so that the collars may be adjusted to give the required degree of tension to the springs. Instead of making the springs out of rubber, I may employ coil springs $15^a$, as shown in Fig. 3; but I prefer to use rubber as this substance also serves as an inclosure for excluding dust and retaining the lubricant, and it is not liable to breakage.

The spring, in my invention, being outside of the socket of the joint, is always readily inspected, and the socketed member of the joint can be made shorter than if the spring were arranged within the socket. This shortening of the sockets on the transmission shaft of a motor vehicle allows the intermediate shaft section to be made correspondingly longer and lessens the angles between the shaft sections. The intermediate shaft section, being always centered by the springs between the adjoining sections, and having a sufficient amount of end play in the sockets of the joints, the ends of the intermediate section can not strike against either of the adjoining sections when the latter move vertically relatively to one another, thus preventing noise and breakage, or injury to the parts.

What I claim is—

1. The combination with two shaft sections and a universal joint connecting said sections so that one may be rotated by the other and permitting relative endwise movement of the sections, of a casing having a spherical bearing on the joint-member on one shaft section, a stop on the other shaft section, and a spring interposed between said stop and casing.

2. The combination with two shaft sections and a universal joint connecting said sections so that one may be rotated by the other and permitting relative endwise movement of the sections, of a casing having a spherical bearing on the joint-member on one shaft section, an adjustable stop on the other shaft section, and a spring interposed between said stop and casing.

3. The combination with two shaft sections and a universal joint connecting said sections so that one may be rotated by the other and permitting relative endwise movement of the sections, of a casing having a spherical bearing on the joint-member on one shaft section, a stop on the other shaft section, and a rubber ring interposed between said stop and casing.

4. The combination with two shaft sections and a universal joint connecting said sections so that one may be rotated by the other and permitting relative endwise movement of the sections, of a casing having a spherical bearing on the joint-member of one shaft section, a collar threaded on to the other shaft section, and a rubber ring interposed between said collar and casing.

5. The combination with two shaft sections and a universal joint connecting said sections so that one may be rotated by the other, of a rigid spherical casing movably fitted to the joint-member on one shaft section and having an opening through which the other shaft section extends, a stop on said latter section and a rubber ring interposed between said stop and casing.

6. The combination with two shaft sections and a universal joint connecting said sections so that one may be rotated by the other, of a rigid spherical casing movably fitted to the joint-member on one shaft section and having an opening through which the other shaft section extends, a collar threaded on to said latter section and a rubber ring interposed between said collar and casing.

7. The combination with a driving shaft and a shaft to be driven, each having universal joint members thereon, of spherical casings movably fitted to said members, an intermediate shaft section extending through said casings and having joint members at its ends engaging the members on the driving and driven shafts, stops upon said intermediate shaft and rubber rings interposed between said stops and casings.

8. The combination with a driving shaft and a shaft to be driven, each having universal joint members thereon, of spherical casings movably fitted to said members, an intermediate shaft section extending through said casings and having joint members at its ends engaging the members on the driving and driven shaft, collars threaded upon said intermediate shaft, and rubber rings interposed between said stops and casings.

9. The combination with a driving shaft and a shaft to be driven, each having universal joint members thereon, of spherical casings movably fitted to said members, an intermediate shaft section extending through said casings and having joint members at its ends engaging the members on the driving and driven shafts, and rubber spring packing on the intermediate shaft constructed to bear against both casings.

10. The combination with a driving shaft and a shaft to be driven, each having universal joint members thereon, of an intermediate shaft section having joint members at its ends engaging the joint members on the driving and driven shafts, said joint members being constructed to permit a relative endwise movement, and means for centering said intermediate shaft.

11. The combination with a driving shaft and a shaft to be driven, each having universal joint members thereon, of an intermediate shaft section having joint members at its ends engaging the joint members on the driving and driven shafts, said joint members being constructed to permit a relative endwise movement, and spring means on said intermediate shaft for centering it.

In testimony whereof I affix my signature in presence of two witnesses.

ALLEN LOOMIS.

Witnesses:
VINCENT LINK,
MILTON TIBBETTS.